(12) United States Patent
Williams et al.

(10) Patent No.: US 7,926,523 B2
(45) Date of Patent: Apr. 19, 2011

(54) TOOL SUPPORT STRUCTURE WITH ADJUSTABLE END ASSEMBLY

(75) Inventors: Dan Williams, Chicago, IL (US); Gary Voong, Berwyn, IL (US)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 12/329,009

(22) Filed: Dec. 5, 2008

(65) Prior Publication Data
US 2010/0139809 A1 Jun. 10, 2010

(51) Int. Cl.
*B25H 1/00* (2006.01)
(52) U.S. Cl. ............... 144/286.5; 144/287; 269/139
(58) Field of Classification Search ....... 144/286.1–287; 248/637, 647, 671; 269/134, 137, 291, 139
See application file for complete search history.

(56) References Cited

U.S. PATENT DOCUMENTS

| | | | |
|---|---|---|---|
| 5,526,856 A | 6/1996 | Pedri | |
| 5,988,243 A | 11/1999 | Ayala et al. | |
| 6,575,213 B1 * | 6/2003 | Houk | 144/287 |
| 6,745,804 B2 | 6/2004 | Welsh et al. | |
| 7,036,540 B2 | 5/2006 | Welsh et al. | |
| 7,222,648 B2 * | 5/2007 | Liu et al. | 144/286.5 |
| 7,481,254 B2 * | 1/2009 | Welsh et al. | 144/286.1 |
| 2006/0038383 A1 * | 2/2006 | Wu | 280/652 |
| 2007/0131306 A1 * | 6/2007 | Snider | 144/286.1 |

OTHER PUBLICATIONS

Bosch TracRac Operating/Safety Instructions for Model T3B Bosch TracRAc Apparatus, downloaded Jan. 10, 2007 from www.boschtools.com (16 pages).
Ryobi Model A18MS01 Miter Saw QuickSTAND document, downloaded Jan. 9, 2007 from www.ryobitools.com (3 pages).
Stablemate PLUS100 Universal Miter Saw Stand document, downloaded Jan. 9, 2007 from www.amazon.com (2 pages).
DeWalt DW723 Miter Saw Stand document, downloaded Jan. 8, 2007 from www.tylertool.com (3 pages).

* cited by examiner

*Primary Examiner* — Shelley Self
(74) *Attorney, Agent, or Firm* — Maginot, Moore & Beck

(57) ABSTRACT

A tool support structure with an adjustable work support assembly comprises a base and a horizontal support provided on the top of the base. A work support assembly is provided on the horizontal support and is linearly slideable in a vertical direction in relation to the horizontal support. The work support assembly includes a first component and a second component. The first component is configured to be fixed in one of a plurality of first vertical positions with respect to the horizontal support. The second component is also provided on the horizontal support and is linearly slideable in a vertical direction in relation to the first component. The second component is configured to be fixed in one of a plurality of second vertical positions with respect to the first component.

19 Claims, 4 Drawing Sheets

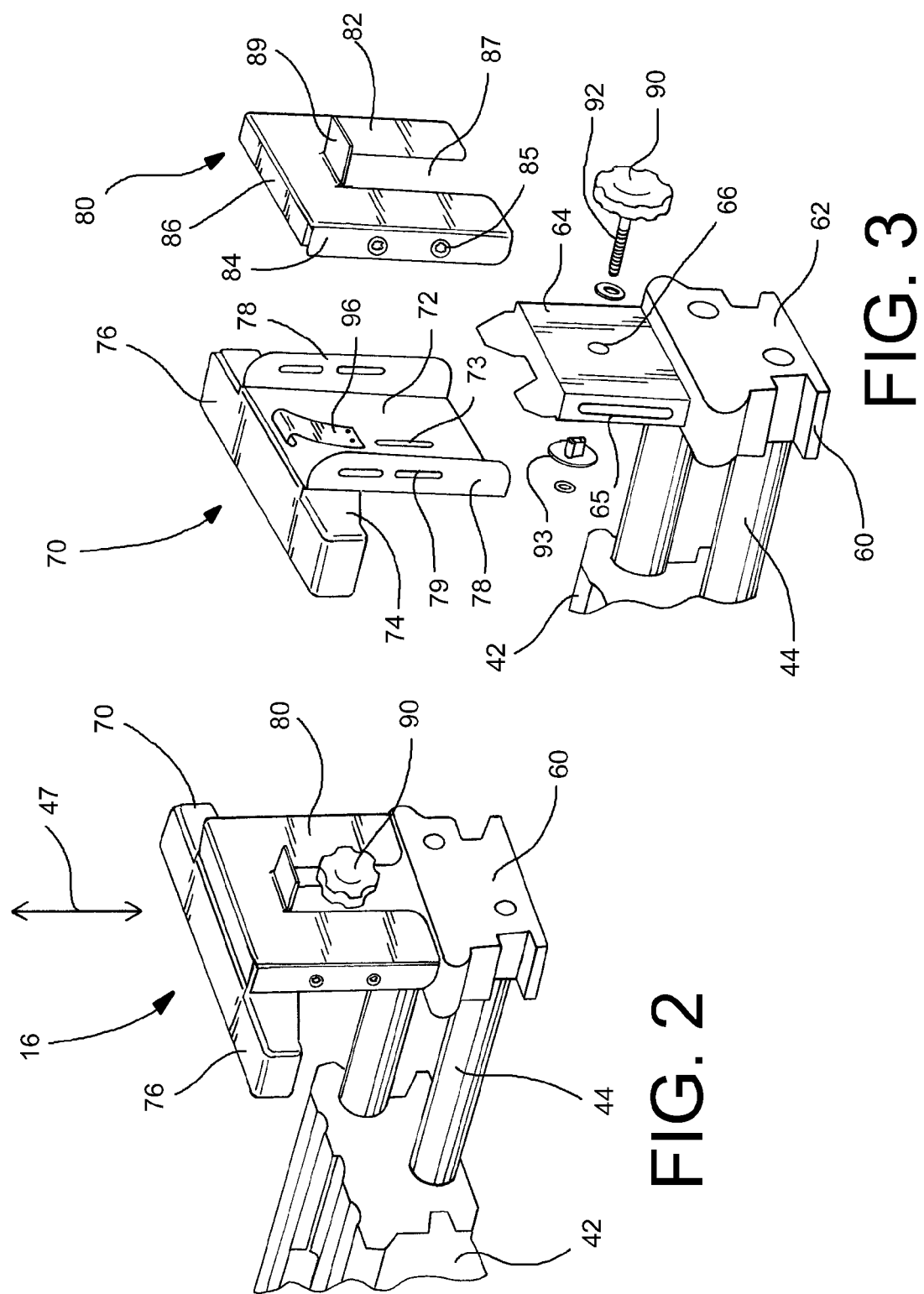

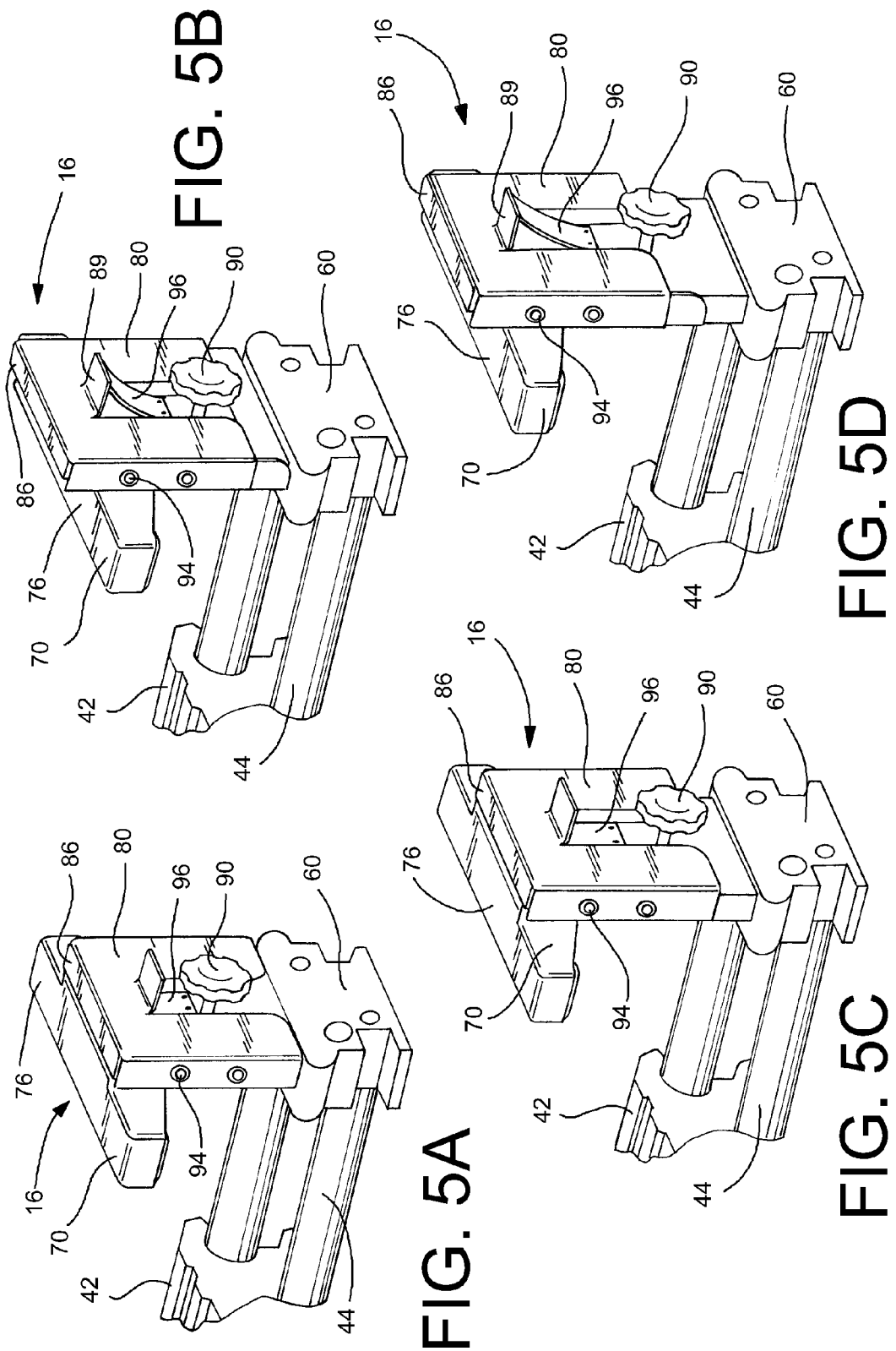

TOOL SUPPORT STRUCTURE WITH ADJUSTABLE END ASSEMBLY

BACKGROUND

The present disclosure relates generally to support structures for tools, and particularly to support structures with adjustable work supports.

It is desirable to mount a power tool such as a miter saw to a support structure such as a work bench. However, miter saws are not typically configured to be directly mounted to certain support structures such as portable workbenches. In order to address this need, various tool mounts have been designed to facilitate attachment of a power tool to a portable workbench. In particular, a pair of tool mounts may be attached to a support structure in a spaced apart fashion. Thereafter, one side of a power tool is attached to one of the tool mounts, while the other side of the power tool is attached to the other tool mount. In this way, the power tool is rigidly secured to the support structure for subsequent use by an operator. The tool mount may include one or more horizontal supports with a work support assembly provided on the ends of the horizontal supports. The work support assemblies are generally designed to be coplanar with the base of the power tool secured to the support structure, thus providing an extended surface for supporting work pieces to be cut or otherwise manipulated using the power tool mounted to the support structure.

One challenge that designers of support structures with tool mounts encounter arises due to the non-uniformity in base features of the power tools and among different manufacturers. Significantly, different power tools have different base heights, and different manufacturers have different heights for similar power tools. This non-uniformity makes it difficult to provide the base of the power tool on the same plane as the work support surface. Thus, it would be advantageous to provide an adjustable work support assembly at the ends of the horizontal support of the tool mount that could accommodate different power tool base heights. It would also be advantageous if the work support assembly offered various components for assisting in securing the work piece in place on the work support surface.

SUMMARY

In accordance with at least one embodiment of the disclosure, a tool support structure with an adjustable work support assembly comprises a base and a horizontal support provided on the top of the base. A work support assembly is provided on the horizontal support and is linearly slideable in a vertical direction in relation to the horizontal support. The work support assembly includes a first adjustable component and a second adjustable component. The first adjustable component is configured to be fixed in one of a plurality of first vertical positions with respect to the horizontal support. The second adjustable component is also provided on the horizontal support and is linearly slideable in a vertical direction in relation to the first adjustable component. The second adjustable component is configured to be fixed in one of a plurality of second vertical positions with respect to the first adjustable component.

Pursuant to at least one embodiment of the disclosure, a support structure for a power tool comprises a base portion with a rail member supported by the base portion. At least one tool mount is supported by the rail member. At least one elongate support member slideably engages the rail member such that the at least one elongate support member is moveable in a first direction relative to the rail member. An end cap is fixed on the end of the at least one elongate support member. A work support slideably engages the end cap such that the work support is moveable in a second direction substantially perpendicular to the first direction. The work support includes a substantially planar work support surface. Furthermore, an end stop slideably engages the work support such that the end stop is moveable in the second direction relative to the work support. The end stop includes a substantially planar clamping surface that is substantially perpendicular to the work support surface.

The above described features and advantages, as well as others, will become more readily apparent to those of ordinary skill in the art by reference to the following detailed description and accompanying drawings. While it would be desirable to provide a support structure that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 2 is an enlarged perspective view of one of the work support assemblies of FIG. 1 including an end cap, a work support member, and an end stop;

FIG. 3 is an exploded perspective view of the work support assembly of FIG. 2;

FIG. 5A is a perspective view of the work support assembly of FIG. 2 with the work support member and end stop in a down position;

FIG. 5B is a perspective view of the work support assembly of FIG. 2 with the work support member in a down position and the end stop in an up position;

FIG. 5C is a perspective view of the work support assembly of FIG. 2 with the work support member in an up position and the end stop in a down position;

FIG. 5D is a perspective view of the work support assembly of FIG. 2 with the work support member and end stop in an up position.

DESCRIPTION

Figure 1:
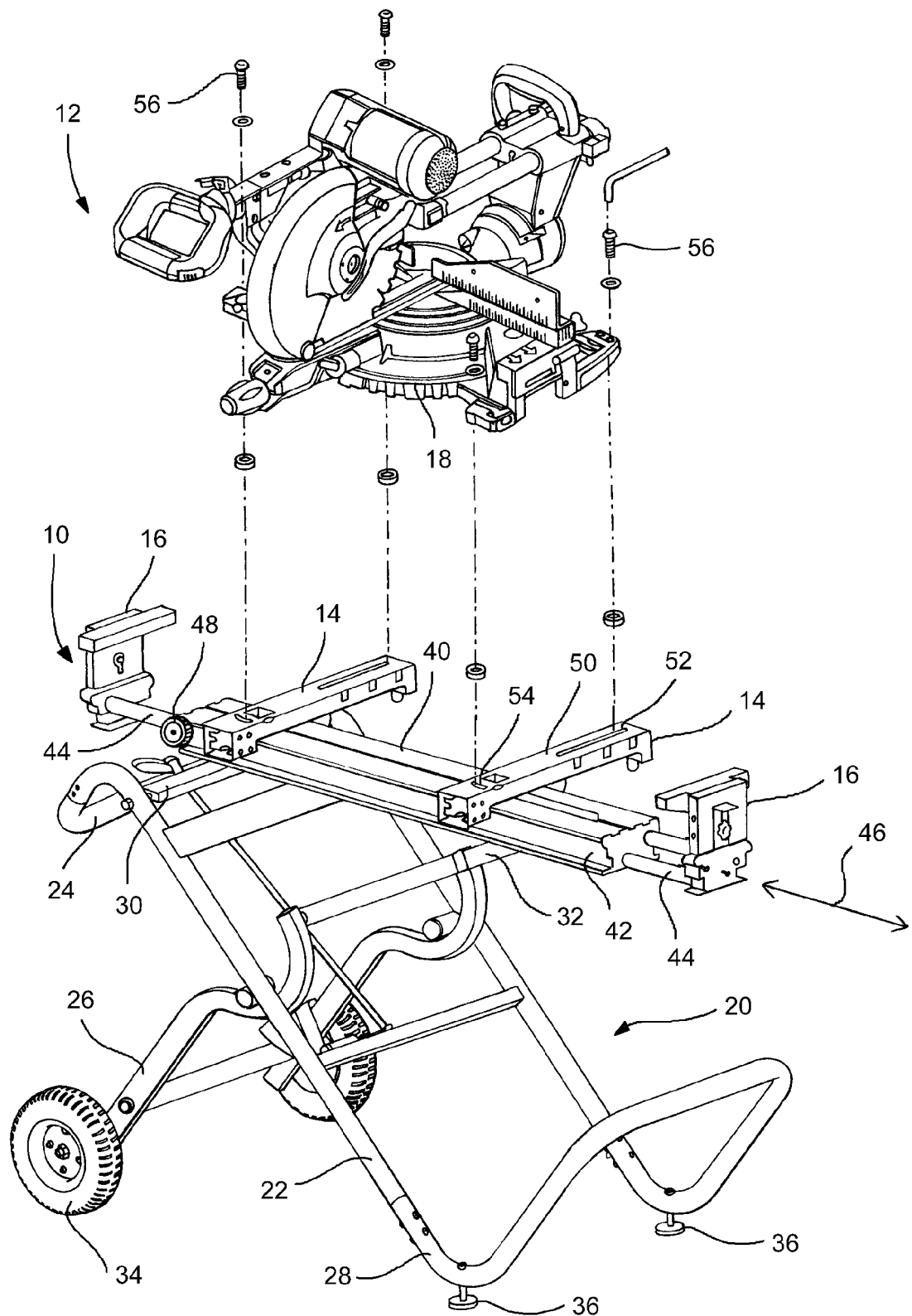
FIG. 1 is an exploded, perspective view of one embodiment of a work support structure including tool mounts, a power tool, and work support assemblies.

Referring to FIG. 1, there is shown a support structure 10 to which is secured a pair of tool mounts 14 and a pair of work support assemblies 16. The tool mounts 14 are configured to facilitate attachment a power tool 12 to the support structure 10. The work support assemblies 16 are configured to support a work piece (e.g., a piece of lumber or a pipe) being manipulated by the power tool 12. The support structure 10 is, by way of example, a portable workbench as shown in FIG. 1. In an alternative embodiment, the support structure may be a stationary workbench. The power tool 12 is, by way of example, a miter saw as also shown in FIG. 1. Alternatively, the power tool may be any other power tool such as a router. When the tool mounts 14 are secured to the support structure 10 and the power tool 12 is secured to the pair of tool mounts 14, then the power tool 12 is rigidly fixed in relation to the support structure 10 for use by an operator of the power tool 12.

The support structure 10 includes a base portion 20 comprising of a framework of connected shafts 22. The shafts 22 are differently shaped to provide different features on the support structure 10. For example, the shafts 22 form a handle portion 24, a first and second ground support portion 26, 28, and a first and second rail assembly supports 30, 32. A pair of wheels 34 is included as part of the first ground support portion 26 to enable a user to readily move the support structure 10 from one location to another. A pair of threadedly adjustable levelers 36 are included as part of the second ground support portion 28.

The support structure 10 further includes a horizontal rail assembly 40 which is supported by the first and second rail assembly supports 30, 32. Each of the first and second rail assembly supports 30, 32 are either in contact with or fastened to the rail assembly 40 such that the rail assembly is supported in a substantially horizontal position when the first and second ground supports 26, 28 are placed on level ground.

With reference to FIGS. 1 and 2, the rail assembly 40 of the support structure 10 includes a base rail member 42 to which the tool mounts 14 are attached. The base rail member 42 defines a number of cavities (not shown) in which a number of elongate support members in the form of outfeed tubes 44 are configured to extend and retract in a telescoping fashion in the horizontal direction (noted by arrow 46 in FIG. 1). A hand wheel 48 with a threaded post is positioned on the side of the base rail member 42. When this hand wheel 48 is tightened in a threaded hole in the side of the base rail member 42, the outfeed tubes 44 are locked in place relative to the base rail member 42. When the hand wheel 48 is loosened, the outfeed tubes 44 are free to slide inward and outward in the direction of arrow 46 in the cavities of the base rail member 42.

Each of the tool mounts 14 are secured to the base rail member and are identical in construction and operation to each other. Each tool mount 14 includes an elongate body 50. The body 50 of each tool mount 14 has a first slot 52 and a second slot 54 defined therein. The first slot 52 extends in a linear manner, while the second slot 54 extends in an arcuate manner. Fasteners, such as screws 56 are inserted through the slots 52, 54 and through holes in the power tool base 18 in order to secure the power tool 12 to the tool mount 14. The tool mount 14 further includes a clamping mechanism (not shown) that is configured to secure the body 50 of the tool mount to the support structure framework 22.

With reference now to FIGS. 2 and 3, the work support assemblies 16 are secured to the ends of the outfeed tubes 44 and are of substantially identical construction. Accordingly, only one of the work support assemblies 16 is described herein. Each work support assembly is designed to receive and support a work piece, e.g., a piece of lumber or a pipe, being worked on or otherwise manipulated with the power tool 12, e.g., a miter saw. Each work support assembly 16 includes an end cap 60, a work support member 70 configured to support the work piece, and an end stop member 80 configured to abut or clamp against the work piece.

As best seen in FIG. 3, the end cap 60 of the work support assembly 16 comprises a support block that is fixed to the end of the elongate support members 44. The end cap 60 includes a lower portion 62 and an integral upper portion 64. The lower portion 62 is securely fastened to the ends of the outfeed tubes 44. The upper portion 64 is substantially rectangular in shape and extends upward from the lower portion 62. A center bore 66 extends through the upper portion 64 of the support block. The center bore 66 is designed and dimensioned to receive the threaded post 92 extending from a hand wheel 90. The threaded post engages a grip nut 93 to tighten the hand wheel 90 against the end cap 60 and work support member 70.

Figure 6:
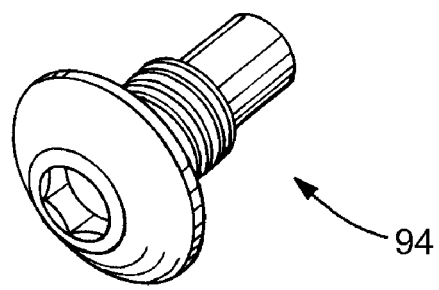
FIG. 6 is a perspective view of a locking screw configured to engage the end stop and work support of FIG. 2.

Recesses 68 are also formed in vertical sidewalls 65 on the upper portion of the end cap 60. The recesses are of a sufficient depth to receive the end portions of locking screws 94 (see FIG. 6) that are threaded through the work support member 70 and end stop member 80 without the screws contacting the end cap 60.

With continued reference to FIGS. 2 and 3, the work support member 70 is mounted on the end cap 60. The work support member 70 slideably engages the end cap 60 such that the work support member is moveable up and down in a substantially vertical direction (as indicated by arrow 47) when the outfeed tubes 44 extend in a substantially horizontal direction. The work support member 70 includes an upright plate 72 connected to a horizontal cross member 74, wherein the plate 72 and the cross member 74 form a T-shape. A substantially planar work support surface 76 is formed on the cross member 74. This work support surface 76 is designed to engage and hold up the end of a work piece being manipulated by the user of the power tool. The opposite end of the work piece is held up by a similar work support surface provided on another outfeed tube extending from an opposite end of the base rail member 42.

The cross member 74 of the work support member 70 is fixedly connected to an upper portion of the upright plate 72. The upright plate 72 includes two flanges 78 extending away from opposite sides of the main body of the plate 72. In particular, the flanges 78 extend in a perpendicular fashion away from the cross member 74. The flanges 74 are designed and dimensioned to fit over the vertical sidewalls 65 on the upper portion 64 of the end cap, with the flanges 74 loosely engaging the vertical sidewalls 65. Vertical slots 79 are positioned on the flanges and configured to engage the threaded portion of locking screws 94.

The upright plate 72 of the work support member 70 also includes a vertical slot 73 which allows the support member 70 to move up and down relative to the end cap 60 while the post 92 and hand wheel 90 continue to hold the end cap and the work support member together.

A leaf spring 96 is fastened to the upright plate 72 just above the vertical slot 73. The leaf spring 96 gradually bends away from the upright plate 72 as it extends upward. Accordingly, a clearance is provided between the upper portion of the leaf spring 96 and the upright plate 72. This allows the upper portion of the leaf spring 96 to be forced back toward the upright plate 72. The leaf spring 96 is made of a resilient piece of metal or other material. As explained in further detail below, the leaf spring 96 is configured to press against the end stop 80 and hold it in an upright position.

Figure 4:
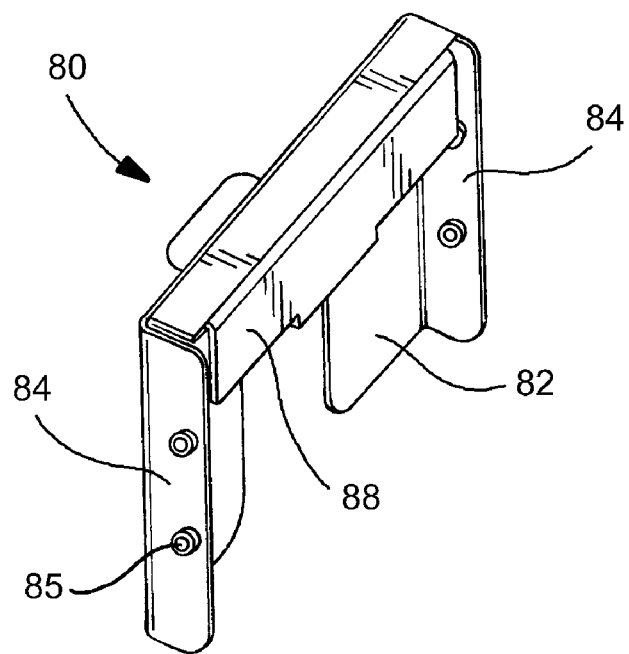
FIG. 4 is a reverse perspective view of the end stop of the work support assembly of FIG. 2.

With reference now to FIGS. 3 and 4, the end stop 80 comprises an end plate 82, side flanges 84, an upper wall 86, and an abutment surface in the form of clamping surface 88. The end plate 82 is positioned in a substantially vertical orientation and includes a large recess 87 formed in the lower center portion of the plate 82. The recess 87 is sufficient in size to receive the leaf spring 96. A tab 89 extends outward from the end plate 82 in a perpendicular fashion at the top of the recess 87. The side flanges 84 are configured to fit over and loosely engage the flanges 78 on the work support member 70. Screw holes 85 are formed in the flanges 84 that receive the threaded portion of the locking screw 94. These screw holes 85 are aligned with the slots 79 when the end stop 80 is positioned on the work support member 70, thus allowing the locking screws 94 to pass through the screw holes 85 and the slots 79 to slideably connect the end stop 80 and the work support member 70. In particular, the cooperation of the flanges 84 and 79 permit the end stop 80 to slide in a vertical direction (as noted by arrow 47 in FIG. 2) relative to the work support member 70, while the locking screws 94 keep the end stop 80 connected to the support member 70.

With reference now to FIGS. 5A-5D, the work support assembly 16 is shown in various positions. In FIG. 5A, the work support assembly 16 is shown with the work support member 70 and the end stop 80 in a downward-most position. In this position, the work support surface 76 of the work support member 70 and the upper surface 86 of the end stop 80 are substantially parallel. Accordingly, the two surfaces 76 and 86 may be used together to support a work piece being manipulated by a user with the power tool 12. By loosening the hand wheel 90, the user may slide the work support member 70 and the stop member 80 to a desired position, such as a position where the surfaces 76 and 86 are parallel with the surface of the power tool base 18 (see FIG. 1). After the work support member 70 and the stop member 80 are positioned in a desired location, the hand wheel 90 may then be tightened to lock the work support member 70 and end stop 80 in place relative to the end cap 60. It should also be noted that in the position shown in FIG. 5A, the upper portion of the leaf spring 96 is pressed against the clamping surface 88 on the upper portion of the stop member 80. Also, locking screws 94 extend through the screw holes 85 and slots 79 to secure the work support member 70 to the end stop 80.

With reference now to FIG. 5B, the end stop 80 has been moved to an upmost position relative to the work support member 70, and the work support member remains in a down position. To accomplish this, the user simply loosens the locking screws 94 joining the end stop 80 and the work support member 70. The user then slides the end stop 80 upward relative to the work support member 70 until the leaf spring 96 pops out into the recess 87. With the leaf spring 96 in this position, the leaf spring abuts the bottom of the tab 89 on the stop member 80, thus holding the stop member 80 securely in the upright position. With the components of the work support assembly 16 in this position as shown in FIG. 5B, it will be noted that the clamping surface 88 of the end stop 80 extends upward in a perpendicular fashion from the work support surface 76 on the work support member 70. Thus, the end tip of a work piece (e.g., the end tip of a piece of lumber) may be positioned against the clamping surface 88 to assist in holding the work piece in place while the surface of the work piece rests on the work support surface 76. If the clamping surfaces 88 of both work support assemblies 16 are used, the work support assemblies 16 may act as a clamp or vice on the work piece. This is possible since the telescoping outfeed tubes 44 are adjustable in the horizontal direction 46 and may be locked in place by tightening the hand wheel 48 (see FIG. 1).

FIG. 5C shows the work support assembly 16 with the work support member 70 in an upmost position and the end stop 80 in a down position relative to the work support member 70. In this position, the work support surface 76 and upper wall 86 are parallel, similar to that of FIG. 5A. To arrive at the position of FIG. 5C starting from the position of FIG. 5A, the user simply loosens the hand wheel 90 and slides the work support member 70 and the stop member 80 to the desired position. After the work support member 70 and the stop member 80 are positioned in a desired location, the hand wheel 90 may then be tightened to lock the work support member 70 and end stop 80 in place relative to the end cap 60.

FIG. 5D shows the work support assembly 16 with both the work support member 70 and the end stop 80 in the upmost position. With the work support assembly 16 in this position, the leaf spring 96 abuts the bottom of the tab 89 on the stop member 80, similar to that shown in FIG. 5B, thus holding the stop member 80 securely in the upright position. With the components of the work support assembly 16 in this position as shown in FIG. 5D, it will be noted that the clamping surface 88 of the end stop 80 extends upward in a perpendicular fashion from the work support surface 76 on the work support member 70. This is also similar to that of FIG. 5B, thus allowing the work support assembly to serve as a clamp or vice on the work piece. If the user wishes to lower the end stop 80 from the upmost position of FIG. 5D down to a lower position, such as that of FIG. 5C, the user loosens the locking screws 94 and presses the leaf spring 96 inward, allowing the end stop to slide downward relative to the work support member.

There is a plurality of advantages arising from the various features of each of the embodiments of the tool support structure with adjustable work support assembly described herein. It will be noted that alternative embodiments of the tool support structure may not include all of the features described yet still benefit from at least some of the advantages of such features. Those of ordinary skill in the art may readily devise their own implementations of the tool mount that incorporates one or more of the features and fall within the spirit and scope of the present invention as defined by the appended claims.

What is claimed is:

1. A support structure for a power tool comprising:
    a base;
    a horizontal support provided on the base;
    a work support assembly supported by the horizontal support, said work support assembly including a first assembly component and a second assembly component,
    wherein the first assembly component is linearly slideable in a vertical direction in relation to the horizontal support, the first assembly component configured to be fixed in one of a plurality of first vertical positions with respect to the horizontal support, and
    wherein the second assembly component is linearly slideable in a vertical direction in relation to the first assembly component, the second assembly component configured to be fixed in one of a plurality of second vertical positions with respect to the first assembly component.

2. The support structure of claim 1 wherein the first assembly component and the second assembly component are positioned on an end cap that is positioned on an end of the horizontal support.

3. The support structure of claim 2 further comprising a tool mount assembly positioned on the horizontal support.

4. The support structure of claim 3 wherein the end cap is slideable in a horizontal direction with the horizontal support such that the position of the end stop is adjustable relative to the tool mount assembly.

5. The support structure of claim 1 wherein the first assembly component defines a top surface configured to support a work piece.

6. The support structure of claim 5 further comprising a lock screw with a hand wheel, the lock screw configured to releasably lock the first assembly component in fixed relation to the horizontal support.

7. The support structure of claim 5 wherein the second assembly component defines a side surface configured to abut the work piece.

8. The support structure of claim 7 wherein the first assembly component comprises a plurality of vertically aligned slots and the second assembly component includes at least one pin, the at least one pin configured to releasably lock the second work support component in fixed relation to the first work support component.

9. A support structure for a power tool comprising:
    a base portion;

a rail member supported by the base portion;

at least one tool mount supported by the rail member;

at least one elongate support member slideably engaging the rail member such that the at least one elongate support member is moveable in a first direction relative to the rail member;

an end cap fixed on the end of the at least one elongate support member;

a work support slideably engaging the end cap such that the work support is moveable in a second direction substantially perpendicular to the first direction, the work support including a substantially planar work support surface; and an end stop slideably engaging the work support such that the end stop is moveable in the second direction relative to the work support, the end stop including a substantially planar clamping surface that is substantially perpendicular to the work support surface.

10. The support structure of claim 9 wherein the base portion comprises a framework of shafts.

11. The support structure of claim 9 wherein the end cap includes a lower portion and an upper portion, wherein the lower portion is fixedly secured to the at least one elongate support member, and wherein the work support slideably engages the upper portion.

12. The support structure of claim 9 wherein the at least one elongate support member comprises an outfeed tube.

13. The support structure of claim 9 further comprising a lock screw configured to extend through a bore in the end cap and a slot in the work support and engage a grip nut, wherein the lock screw secures the work support to the end cap when the lock screw is tightened against the grip nut.

14. The support structure of claim 9 wherein the work support comprises an upright plate and a cross member positioned along an upper portion of the upright plate, wherein a flange is positioned along a side of the plate and wherein the substantially planar work support surface is provided on the cross member.

15. The support structure of claim 14 wherein the work support further comprises a leaf spring secured to the upright plate and extending away from the upright plate near the upper portion of the upright plate.

16. The support structure of claim 15 wherein the leaf spring engages the end stop when the end stop is moved in the second direction relative to the work support.

17. The support structure of claim 16 wherein the end stop comprises an outer wall positioned opposite the clamping surface, the end plate including a recess with a tab extending outward at the top of the recess, wherein the leaf spring is configured to extend through the recess and engage the tab when the end stop is moved to an upper position.

18. The support structure of claim 14 wherein at least one vertical slot is formed in the flange and a screw extends through a hole in the end stop and engages the slot to secure the end stop to the work support.

19. The support structure of claim 9 further comprising at least two wheels connected to the base portion.

* * * * *